US008355180B2

(12) United States Patent
Wu et al.

(10) Patent No.: US 8,355,180 B2
(45) Date of Patent: Jan. 15, 2013

(54) AUTHENTICABLE ANTI-COPY DOCUMENT AND METHOD TO PRODUCE AN AUTHENTICABLE ANTI-COPY DOCUMENT WITH A COMBINED VOID PANTOGRAPH AND FAUX WATERMARK SECURITY FEATURES

(76) Inventors: Judy Wailing Wu, Markham (CA); Robert Andrew McTaggart, Markham (CA)

( * ) Notice: Subject to any disclaimer, the term of this patent is extended or adjusted under 35 U.S.C. 154(b) by 680 days.

(21) Appl. No.: 12/456,712

(22) Filed: Jun. 22, 2009

(65) Prior Publication Data

US 2010/0321738 A1 Dec. 23, 2010

Related U.S. Application Data

(60) Provisional application No. 61/132,068, filed on Jun. 16, 2008.

(51) Int. Cl.
*B41M 3/10* (2006.01)
*B41M 3/14* (2006.01)
*B42D 15/10* (2006.01)

(52) U.S. Cl. ......... 358/3.28; 283/72; 283/113; 283/902

(58) Field of Classification Search ................ 358/3.28, 358/1.9; 283/72, 113, 901, 902; 382/100; 399/366; 347/107
See application file for complete search history.

(56) References Cited

U.S. PATENT DOCUMENTS

| | | | |
|---|---|---|---|
| 4,210,346 A | 7/1980 | Mowry, Jr. et al. | |
| 5,538,290 A | 7/1996 | Diamond | |
| 5,575,508 A | 11/1996 | Diamond | |
| 5,735,547 A | 4/1998 | Morelle et al. | |
| 5,768,426 A | 6/1998 | Rhoads | |
| 5,785,353 A | 7/1998 | Diamond | |
| 5,924,737 A | 7/1999 | Schrupp | |
| 5,984,364 A | 11/1999 | Diamond | |
| 6,886,863 B1 | 5/2005 | Mowry, Jr. et al. | |
| 7,463,389 B2 * | 12/2008 | Ohno | 358/3.28 |
| 7,609,396 B2 * | 10/2009 | Harada | 358/3.28 |
| 7,609,989 B2 * | 10/2009 | Harada | 399/366 |
| 7,657,057 B2 | 2/2010 | Davidson et al. | |
| 7,684,089 B2 | 3/2010 | Yamada | |
| 7,706,026 B2 * | 4/2010 | Ishii | 358/3.28 |
| 7,742,181 B2 * | 6/2010 | Nakano | 358/1.14 |
| 7,793,204 B2 | 9/2010 | Carlson et al. | |
| 7,847,980 B2 * | 12/2010 | Aritomi et al. | 358/3.28 |
| 7,869,090 B2 * | 1/2011 | Wang et al. | 358/3.28 |

* cited by examiner

*Primary Examiner* — Scott A Rogers
(74) *Attorney, Agent, or Firm* — Grossman, Tucker, Perreault & Pfleger, PLLC

(57) ABSTRACT

The present disclosure relates to a methodology, apparatus and product, of combining a void pantograph security feature with a faux watermark feature creating a resilient void pantograph digitally manipulated in an electronic format and printed through any digital platform from high resolution output devices such as but not limited to film/plate image setters used in standard offset printing, high speed commercial digital ink or toner based presses and printers, and low resolution output devices such as all ink/toner based desktop printers, multifunction printers, in which the amalgamation of the two features authenticate the other feature to produce a document security feature which is self authenticable. Such electronic format can conveniently be issued on-demand onto plain paper using any digital output device driven by an executable software, print driver and/or printer firmware application.

5 Claims, 12 Drawing Sheets

First Primary Care Physicians
456 Main Street, S.E. Suite 100, Washington, DC 2003
888 888 8888 Fax: 888 888 0088

Name  Napolean Dynamite        Date 05/29/2008
Addr  123 Main Street, SE      DOB 01/01/1950
City  Washington, DC 20003     888-888-1188

Rx: LISINOPRIL 10 MG TABS One (1) tablet by mouth once a day

Generic: LISINOPRIL

Disp   *30*     THIRTY

Refill *3*

A generically equivalent              John Smith MD
product may be dispensed              LIC#: 1234567890
unless the practitioner hand          Rx#: 1525638876764810
writes "Dispense as Written" on
the face of this prescription

FIGURE 1

SECURITY FEATURES INCLUDE COLORED VOID BACKGROUND

First Primary Care Physicians
456 Main Street, S.E. Suite 100, Washington, DC 2003
888 888 8888 Fax: 888 888 0088

Name Napolean Dynamite            Date 05/29/2008
Addr 123 Main Street, SE            DOB 01/01/1950
City Washington, DC 20003           888-888-1188

Rx LISINOPRIL 10 MG TABS One (1) tablet by mouth once a day

Generic: LISINOPRIL

Disp \*\*\*30\*\*\*        THIRTY

Refill \*\*\*3\*\*\*

A generically equivalent
product may be dispensed
unless the practitioner hand
writes "Dispense as Written" on
the face of the prescription John Smith MD
LIC#: 1234567890
Rx#: 1525688876764810

FIGURE 3

SECURITY FEATURES INCLUDE COLORED VOID BACKGROUND

First Primary Care Physicians
456 Main Street, S.E. Suite 100, Washington, DC 2003
888 888 8888 Fax: 888 888 0088

Name Napolean Dynamite  Date 05/29/2008
Addr 123 Main Street, SE  DOB 01/01/1950
City Washington, DC 20003  888-888-1188

Rx LISINOPRIL 10 MG TABS One (1) tablet by mouth once a day

Generic: LISINOPRIL

Disp *30*   THIRTY

Refill *3*

A generically equivalent product may be dispensed unless the practitioner hand writes "Dispense as Written" on the face of the prescription John Smith MD
LIC#: 1234567890
Rx#: 1525686876764810

FIGURE 6

AUTHENTICABLE ANTI-COPY DOCUMENT AND METHOD TO PRODUCE AN AUTHENTICABLE ANTI-COPY DOCUMENT WITH A COMBINED VOID PANTOGRAPH AND FAUX WATERMARK SECURITY FEATURES

CROSS REFERENCE TO RELATED APPLICATIONS

The present application claims the benefit of the filing date of U.S. Provisional Application Ser. No. 61/132,068 filed Jun. 16 2008, the disclosure of which are hereby incorporated herein by reference.

FIELD OF THE INVENTION

The present invention relates to apparatus and method for producing authenticable documents, using a resilient void pantograph feature which is the combined effect of a void pantograph with a faux watermark feature.

More specifically, the present invention relates to an apparatus and method for combining both void pantograph with faux watermark creating a resilient void pantograph and introducing it into documents requiring document security features such as gift coupon, various kinds of tickets, coupon, prescription form, checks, certificate, etc. where such apparatus and method also call for accurately and easily determining the authenticity of said secured document through the detection of the alter state of the resilient void pantograph in the replica copy of the original document.

BACKGROUND OF THE INVENTION

Many methods and products have been developed to prevent the unauthorized reproduction of original valuable documents, such as checks, coupons, gift certificates, licenses, prescription forms, personal identification papers, records, and packaging material for brand protection to deter unauthorized reproduction of the originals. In the past, generally secured documents were produced using standard print processes such as but not limited to offset printing (lithography), letterpress, flexographic, intaglio and gravure; more importantly with recent advancements in the digital print devices and the ever increase demand in on-demand printing, secured documents must also be produced using ink and toner based commercial digital presses or printers as well as desktop printers and multifunctional printers. Therefore the methods and products must include the ability to translate equally well from high resolution outputs such as at resolution 2400 dots per inch or greater, used in standard print processes to low resolution outputs such as 300 dots per inch or less, used in digital print devices. Generally, these methods and products enable unauthorized copies of original documents to be readily distinguished from the originals regardless of the print processes.

One such methods and products may include the use of void pantographs where one would embed images and or warning phases such as "VOID" or "COPY" in the original documents that are nearly invisible to the naked eye but which become apparent upon photocopying thus allowing the detection of a copied document.

Other methods and products may include the use of a faux watermark where one would use a phase such as "ORIGINAL DOCUMENT" that are barely visible to the naked eye but which would disappear upon photocopying therefore may allow the detection of a copied document where the copied original would be the missing such watermark.

It is known that with most traditional void pantograph security features, one could suppress the hidden warning phase such as "VOID" or "UNAUTHORIZED COPY" by changing the photocopier's setting so that the desired effect of the warning phase would be eliminated from the photocopy of the original. Just as for the faux watermark "ORIGINAL DOCUMENT" where one can again by changing the photocopier's setting so that the desired effect of the revealing the watermark would be achieved on the photocopy of the original.

Due to the continuous advancements and improvements on photocopier equipment where the scanning and output resolutions are at 600 dots per inch or greater coupled with multiple adjustment settings, now available in photocopiers allowing the user to replicate the desired "lifelike" copies of the originals. Under these scenarios, many traditional security features become ineffective against unauthorized reproduction where the photocopies are nearly indistinguishable to the originals. It is especially true, when describing documents which needed to be secured with traditional security features, which are now to be printed using low resolution output devices such as 300 dots per inch or less, one can see the challenge lies with the ever increasing scan and output resolutions of the photocopier being greater than the output resolution of the original printing device.

Therefore, what is needed in the art is a document protection method and apparatus that enables a simple and expedient way to enhance the effectiveness of traditional security features by incorporating the void pantograph feature and faux watermark creating a novel resilient void pantograph security feature that may be printed using standard print processes, but even more importantly, may be digitally printed using all types of digital print presses, and printers to prevent the unauthorized reproduction of original documents from the advancing photocopiers.

Furthermore, what is needed in the art are methods for producing such original documents having such improved resilient void pantograph security features where each resilient void security feature is calibrated, modified, customized and transformed into a feature that is unique to each particular print process. This calibration process may maximize the effective of such security features against a broader range of photocopiers.

Additionally, what is also needed in the art are methods for producing such original documents where such improved resilient void pantograph security feature in the electronic format can conveniently be issued on-demand onto plain paper along with the variable text and or information of the document in one pass, using any digital output device driven by an executable software, print driver and/or printer firmware application.

SUMMARY OF THE INVENTION

The present invention may provide an improved method and apparatus for printing original documents with enhanced anti-copy security against advancing photocopiers that may also be easily authenticated with and or without the use of special authentication devices or equipment.

Advantages of the present invention allows original documents be printed using standard press processes such as but not limited to offset printing (lithography), letterpress, flexographic, intaglio and gravure as well as, the addition of digital output equipment at any resolution, such as laser printers, multifunctional printer/copier, ink-jet printer, commercial sheet/web, ink/toner based digital presses such as but not limited to presses from HP, Kodak, Xerox, Oce, Xeikon etc.

This invention triumph over prior art, by producing original documents having such improved security feature by utilizing both a void pantograph feature with a faux watermark security features to create the resilient void pantograph feature where the resilient void pantograph would be calibrated for, modified, transformed and customized specify for each print process and output device as to maximize the effective of the security features against photocopiers. The additional benefits of a customized feature dependent to the output device as well as it's related workflow, thereby securing to electronic file to a specify device.

Additionally, the present invention may also provide a method for producing such original documents where such improved resilient void pantograph security feature in the electronic format can conveniently be issued on-demand onto plan paper along with the variable text/information of the document using any digital output device driven by an executable software, print driver and/or printer firmware application.

In accordance with this invention, there is to provide a method of producing an enhanced anti-copy security feature by the amalgamation of a void pantograph security feature with a faux watermark placed onto the same side of a document in which such a document may be easily authenticated through the verification of the presence or absence of the combined reactions of the void pantograph security feature and the faux watermark on said document. In addition, the enhance anti-copy security feature is also calibrated to a specific output device from traditional offset print processes to all digital output equipment in order to maximize the effectiveness of said feature against the ever advancing photocopiers. Furthermore, the enhanced anti-copy security feature in its electronic digital file form would be suited for use as a stand-alone graphic image or incorporated onto any document through other software program ready for output onto a wide range of output devices. Additionally, the electronic digital security files can reside in a client/server based, printer driver or firmware of digital output equipment ready to be recalled and incorporated into other documents requiring the enhance anti-copy security feature.

BRIEF DESCRIPTION OF THE DRAWINGS

The above-mentioned and other features and advantages of this invention, and the manner of attaining them, will become appreciated and be more readily understood by reference to the following detailed description of one embodiment of the invention in conjunction with the accompanying drawings, wherein like numerals refer to like elements, and wherein:

FIG. 1 shows one example of an original document in the form of a RX prescription, with an embedded void pantograph security feature.

FIG. 3 shows a B&W photocopy of FIG. 1.

FIG. 6 shows another photocopy of FIG. 4.

DETAILED DESCRIPTION

The present disclosure relates to providing a methodology, apparatus and product to improve the workability of a known anti-copy security feature such as the void pantograph against advancing photocopiers by combining the void pantograph with a faux watermark thereby transforming the dual features into a resilient void pantograph and printed onto the same side of a document where such a security feature may become an easily authenticable feature that may be verified with or without the use of special authentication devices or equipment.

Most skilled in the art are knowledgeable regarding the workability of void pantographs and their known reactions when photocopy on photocopiers. Examples of public domain void pantograph features such as U.S. Pat. Nos. 4,227,720, 4,265,469, 4,310,180 and 4,341,404, as well as patented features such as US Patents such as but not limiting to U.S. Pat. Nos. 5,018,767, 5,193,853, and 5,707,083, are void pantograph features that are becoming less and less effective against the ever advancing copier/scanner technology. The entire disclosure of each of these United States patents is hereby incorporated by reference into this specification.

Watermarking is generally used to protect software by marking all the outputs for said computer program with a digital watermark indicating with such verbiage as "not for commercial use" so one can distinguish outputs/documents generated from commercial version of software and non-commercial version such as trail version of the software as in stated in the teaching of U.S. Pat. No. 7,369,679. And in the field of as a document security feature such as U.S. Pat. No. 7,457,957 relates to the state of the watermark and the encoding and verifying the encrypted watermark to authenticated the document just as other examples of watermarking can also be a process for altering media content to embed a machine-readable code into the data content. The data may be adjusted such that the embedded code is unnoticeable to the user, yet may be detected through an automated detection process such as the one described in U.S. Pat. No. 6,614,914. The entire disclosure of each of these United States patents is hereby incorporated by reference into this specification.

In the present invention, and in one embodiment thereof, there is provided a methodology, apparatus and product of a resilient void pantograph where such security feature is the amalgamation a void pantograph feature with a faux watermark to producing a combined security feature onto the same sided document. The document with the combined feature then become an easily authenticable feature that may be verified with or without the use of special authentication devices or equipment by simply examining whether the presence or absence of the predicted effect of a void pantograph coupled with the presence or absence of the predicted effect with a faux watermark.

Figure 2:
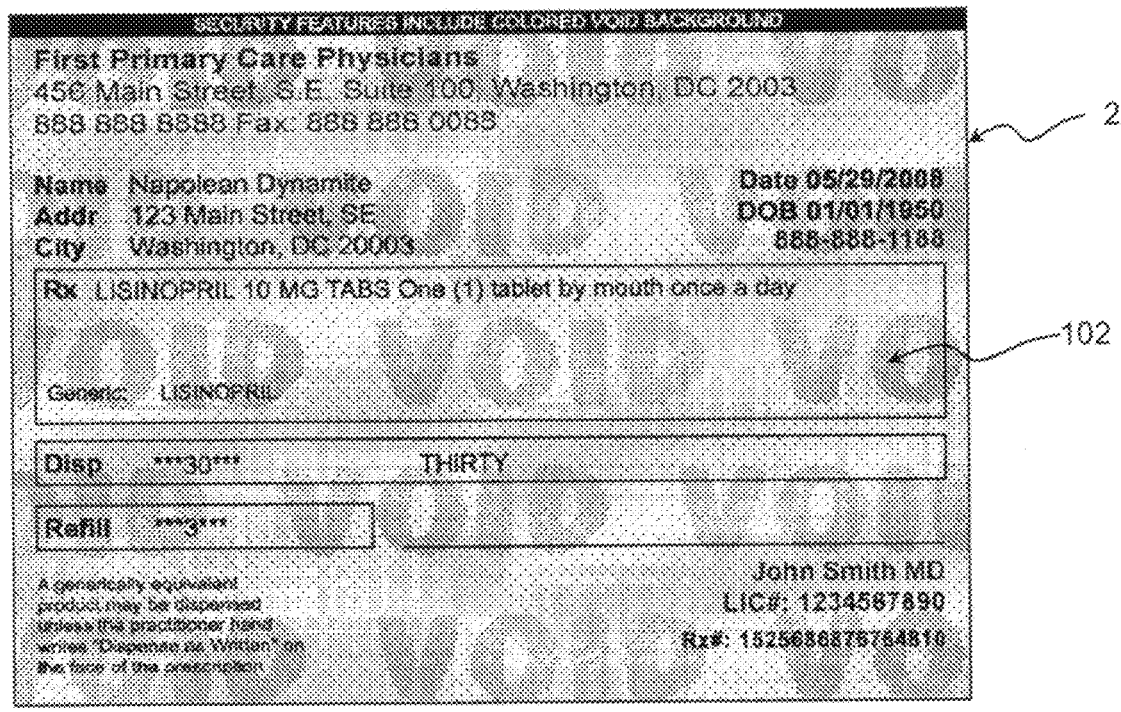
FIG. 2 shows a color photocopy of FIG. 1.

FIG. 1 illustrates one example of an original document 1 in the form of a RX prescription, incorporated a void pantograph security feature 101 (such as but not limited to one described in the teachings of the above mentioned examples) where the background image and hidden warning message image may be presented as a uniform tone to the unaided eye. The desired effect on a photocopy 2 in which the copy can be distinguishable from the original RX prescription 1 with the warning phrase such as "VOID" 102 appearing in the copy, as illustrated in FIG. 2. In this case it is exemplary of a positive predicted reaction for a void pantograph screen. Most void pantographs are designed to work on color copiers. The background screen is usually a uniform tone (of some color) therefore it is expected that the replica of a colored document would also be in color. Notwithstanding many void pantographs also will have a varying degree of predictable positive reaction on B&W copiers however, B&W copiers work on a different set of reproduction parameters which are mainly driven by a set of thresholds of determining particle sizes on a document to separate what is noise such as the background for elimination and what is the text, graphic for reproduction. The dialing the setting on a B&W copier will produce a B&W photocopy 3 which may produce a negative predicted reaction thereby eliminating the effect of a void pantograph screen as shown in FIG. 3 where the warning phrase such as "VOID" 103 is eliminated and only the text/graphic would remain and appear in the copy.

Also with the advancements of newer color copiers, no adjustments may even be necessary since the newer copiers have the ability to render the copy with its blurring and refocusing algorithm to produce the best possible copy. Again, in these cases the photocopies will no longer be easily distinguishable from its original. This is also a case which exemplifies a negative predicted reaction for a void pantograph screen.

Figure 4:
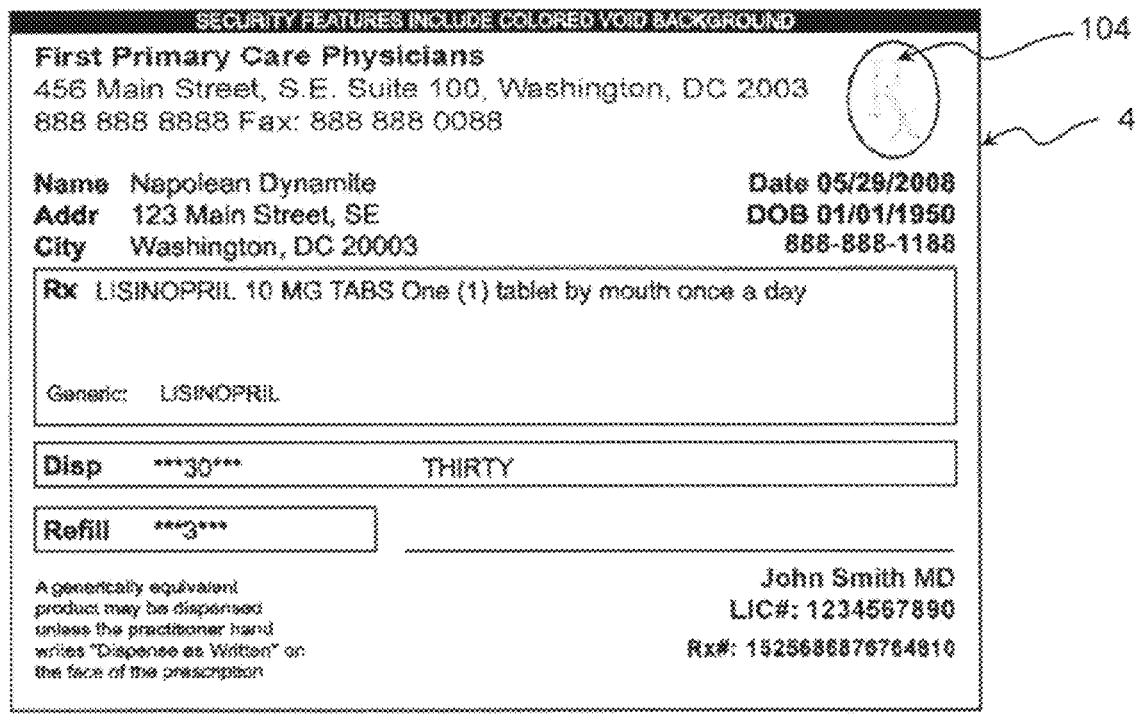
FIG. 4 shows one example of an original document in the form of a RX prescription, incorporated a faux watermark security feature
Figure 5:
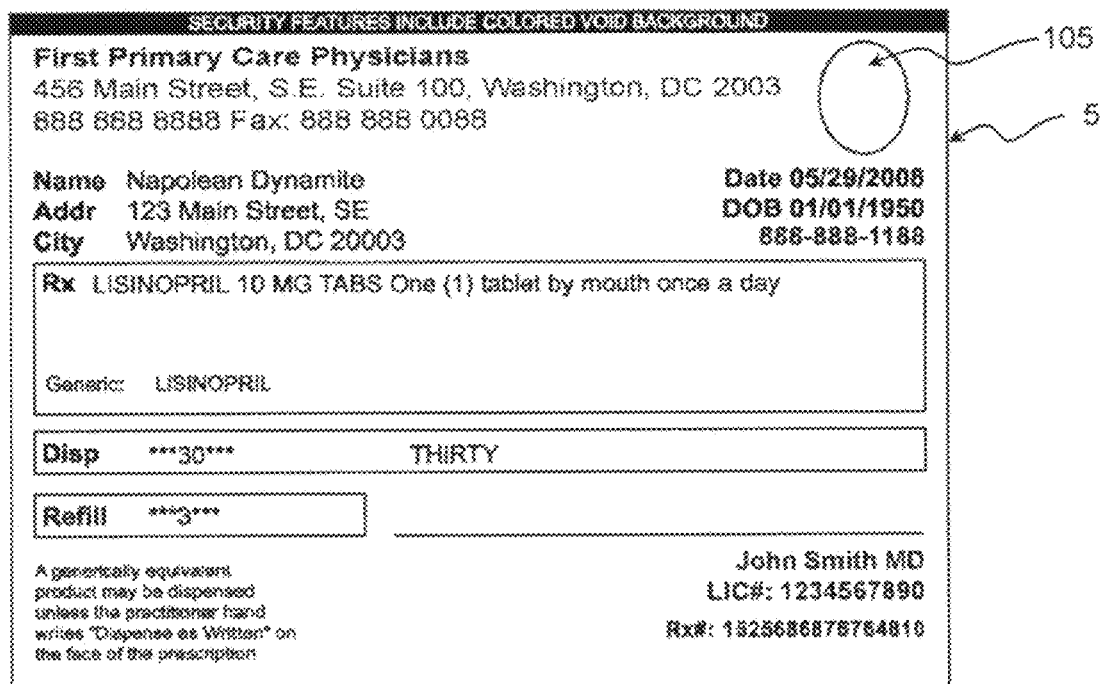
FIG. 5 shows a photocopy FIG. 4.

In FIG. 4 which shows an example of an original document 4 in the form of a RX prescription, incorporated with a faux watermark security feature 104 in the form of an "RX" symbol such symbol/logo/graphic printed on the original is barely visible to the naked eye. Such faux watermarking 104 can also be in the form of text such as the phrase "ORIGINAL DOCUMENT" and as an anti-copy feature, the photocopied faux watermark 105 is designed to not re-produce on the photocopy 5 of an original as illustrated in FIG. 5. This demonstrates the case of a predicted positive reaction for a faux watermark. However, it is not a difficult task to replicate documents with false faux watermark; this too can be accomplished by adjusting the settings of the photocopier. In the case of a B&W copier, a dialing setting on a B&W copier would increase the threshold parameters to render a photocopy 6 where a replicated faux watermark 106 would appear as shown in FIG. 6. In this case it is exemplary of a negative predicted reaction for a faux watermark.

Figure 7:
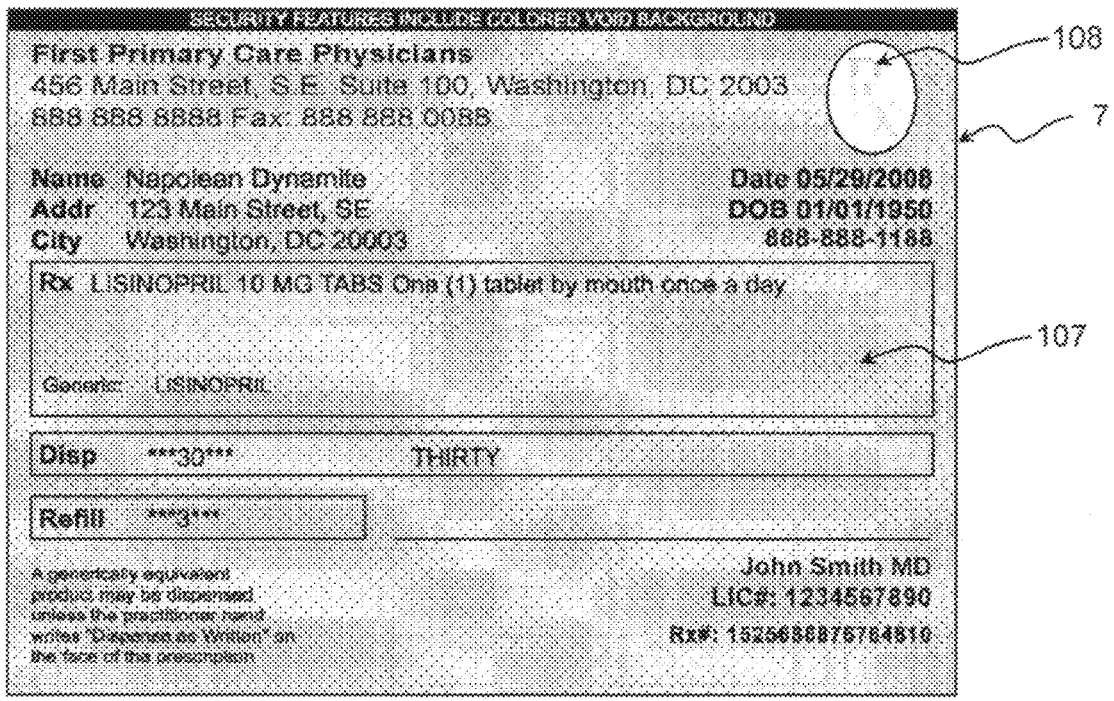
FIG. 7 shows one example of an original document in the form of a RX prescription, with an embedded resilient void pantograph security feature.

The object of the present invention is to create a resilient void pantograph security feature by amalgamating a void pantograph security feature 107 with a faux watermark 108 onto the same document 7 as shown in FIG. 7. The resilient void pantograph capitalizing on the known predicted reactions of a void pantograph security feature coupled with a known predicted reactions of a faux watermark on photocopiers therefore the combined feature is a highly and effective anti-copy security feature that is difficult to suppress by adjusting the settings on the photocopiers in the illicit attempts to reproduce an indistinguishable replica copy.

Figure 8:
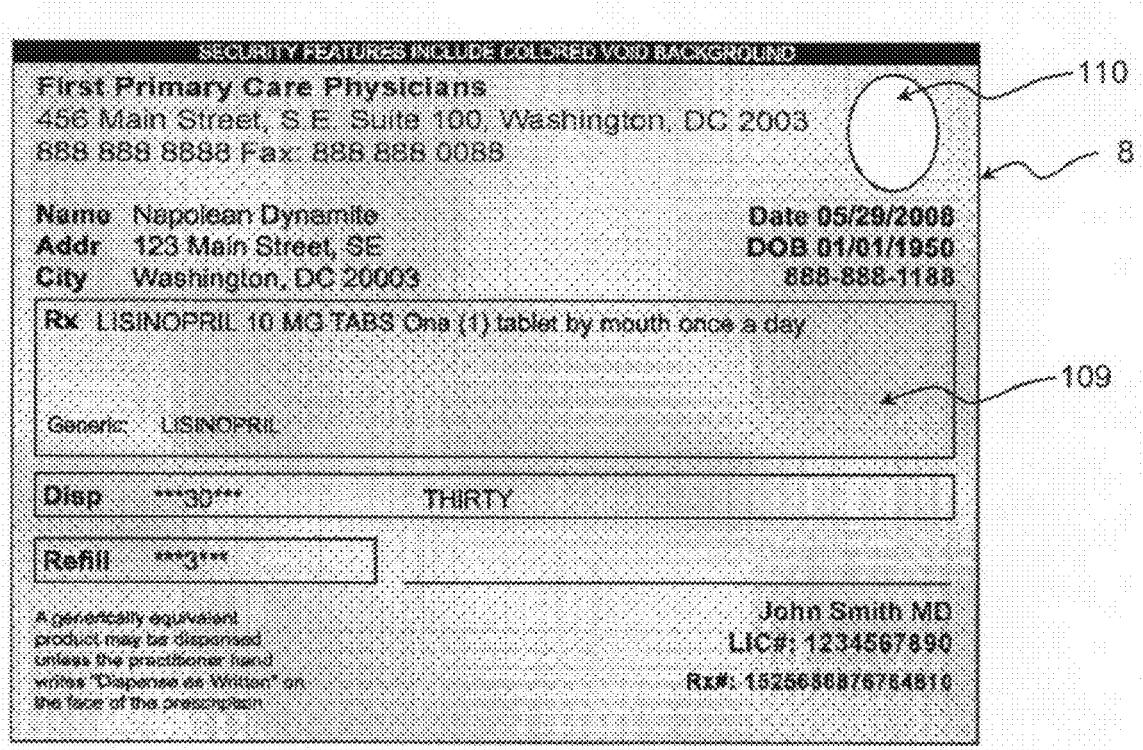
FIG. 8 shows a photocopy of FIG. 7.
Figure 9:
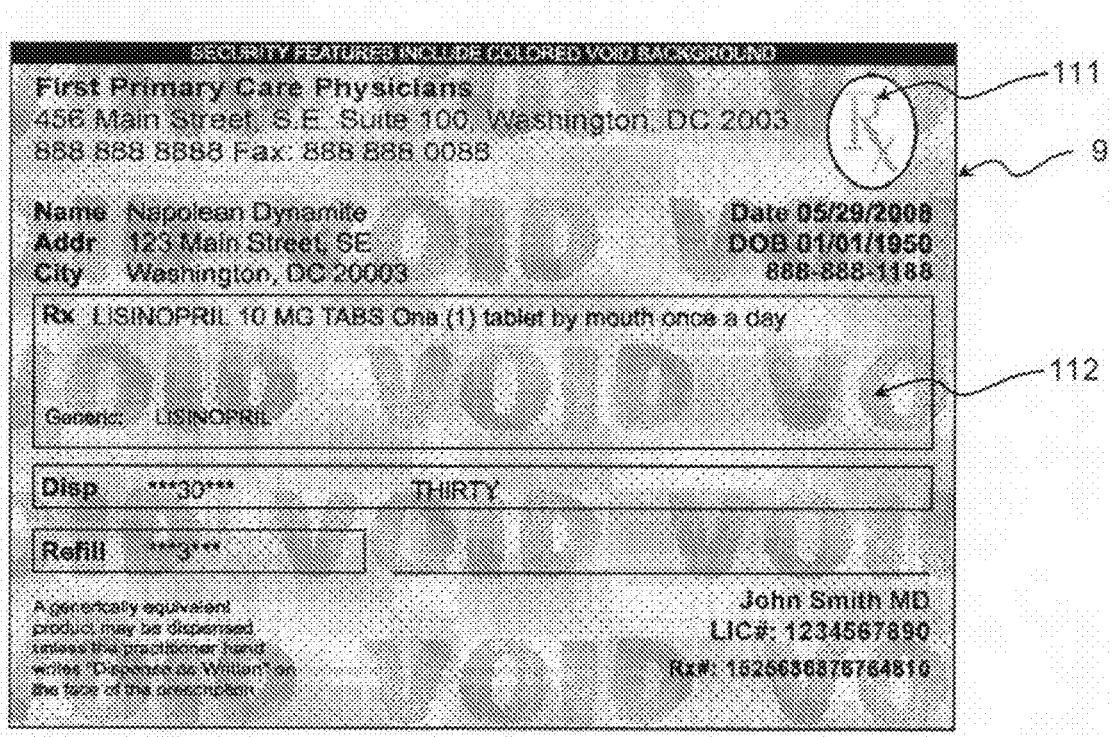
FIG. 9 shows another photocopy of FIG. 7.

FIG. 8 shows a photocopy 8 where the predicted reaction of the void pantograph screen with the warning phrase 109, was compromised and did not appear in the photocopy 8 (a negative predicted reaction), however, the faux watermark 110 remained robust for a positive predicted reaction and did not appear in the photocopy 8. Therefore photocopy 8 can easily be detected as a copy and not an original. Visa-versa holds true in photocopy 9 as shown in FIG. 9, where the predicted reaction of the faux watermark 111 was compromised (a negative predicted reaction) and appeared in the photocopy. However, the void pantograph screen 112 remained robust for a positive predicted reaction with the warning phrase appearing in the photocopy 9. Therefore photocopy 9 can easily be detected as a copy and not an original.

Figure 10:
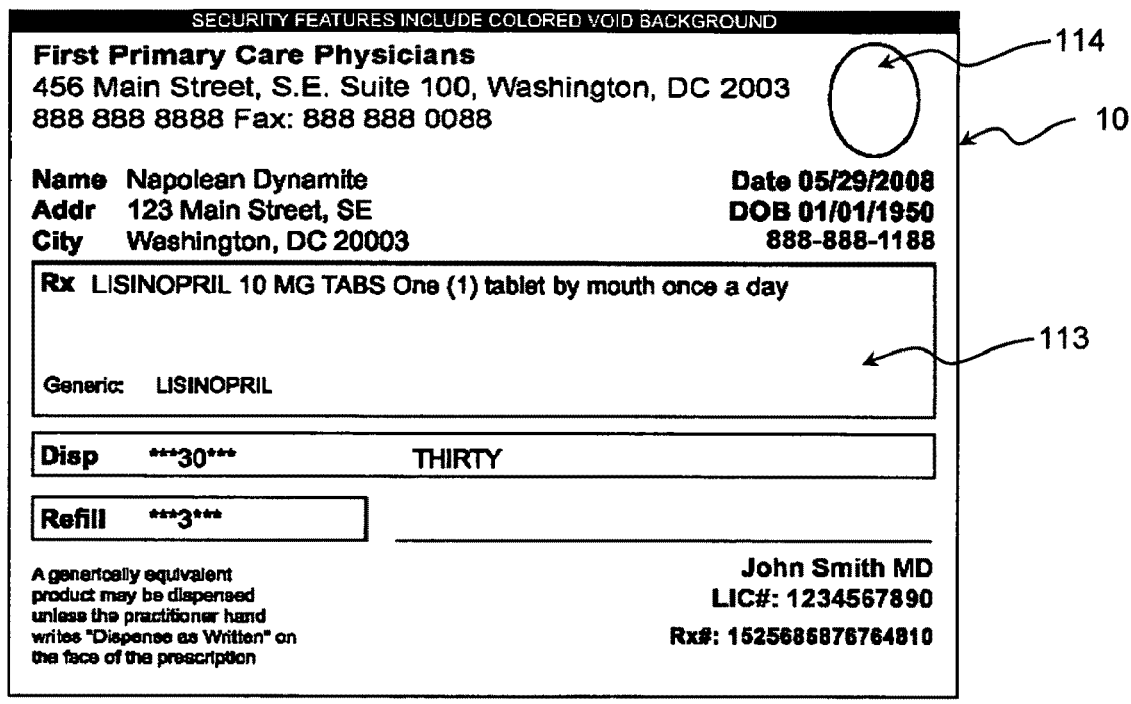
FIG. 10 shows another photocopy of FIG. 7

FIG. 10 shows a B&W photocopy 10 where the predicted reaction void pantograph screen with the warning phrase 113 was compromised and did not appear in the photocopy 10 (a negative predicted reaction), however, the faux watermark 114 remained robust for a positive predicted reaction and also did not appear in the photocopy 10. Therefore photocopy 10 can easily be detected as a copy and not an original.

The table below summarizes the matrix of the using 2 features, the void pantographs combined with the faux watermark and the predicted reactions to produce a "positive" presenting the presence of the positive predicted effect on the photocopier and predicted reaction to produce a "negative" presenting the absence of the negative predicted effect on the photocopier generating a total of four (4) possible predicted results.

| | Secured Document with Resilient Void Pantograph void pantograph + faux watermark | | |
|---|---|---|---|
| | If Void Pantograph is: | If Faux Watermark is | Document is verified as: |
| 1 | "Negative" = Absence of warning phase | "Negative" = Absence of faux watermark | PHOTOCOPY of an Original Documents absence of faux watermark |
| 2 | "Positive" = Presence of warning phase | "Positive" = Presence of faux watermark | PHOTOCOPY of an Original Document presence of warning phase |
| 3 | "Positive" = Presence of warning phase | "Negative" = Absence of faux watermark | PHOTOCOPY of an Original Document presence of warning phase |
| 4 | "Negative" = Absence of warning phase | "Positive" = Presence of faux watermark | ORIGINAL Document absence of warning phase and presence of faux watermark |

In addition, the resilient void pantograph is a calibrated feature which has been modified, transformed and customized specify for each print process as with the traditional standard print processes such as but not limited to offset printing (lithography), letterpress, flexographic, intaglio and gravure, more importantly, printing on the digital output platform with lower output resolution then the higher scan and output resolution of photocopiers in order to maximize the effective of the security features against the advancing photocopiers.

Dot gain is a known and natural phenomenon in printing when inks are involve in the print methods. This is true for both tradition offset print processes and digital presses and printers of all type, speed, size and resolution. Each print process will have its unique dot gain ratio. Based on this fact, we would include a calibration process to set the optimal parameters for the resilient void pantograph security features which is linked to a specific print process, accounting for all factors that would effect and alter final output of the printed document in order to increase the effectiveness of the security feature. A fixed or un-calibrated system would not be ideal method since a fixed pre-set density level for security features such as void pantograph screen or the faux watermark would produce variable density levels on final printed secured documents which are dependent on the print processes and workflow in the production of the final printed secured documents. In some case, the density level would surpass the optimal density range needed to effective against photocopiers and in other case, the density level would not meet the required density range.

Figure 11:
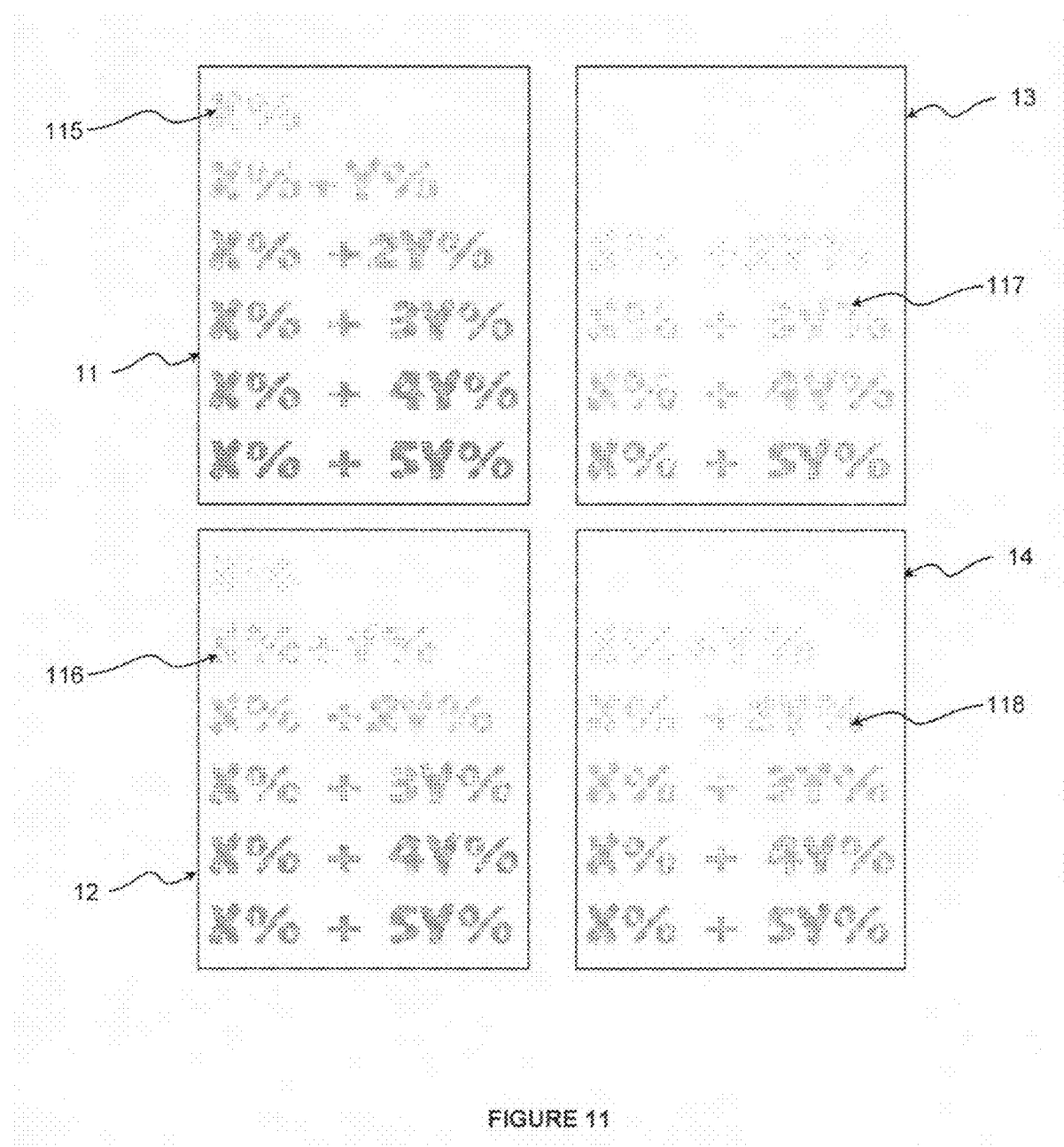
FIG. 11 shows output examples of a calibration file from various ink and toner based digital presses and printers.

Therefore a calibration process is critical to the success of creating the optimal anti-copy security feature such as the resilient void pantograph. As illustrated in FIG. 11, where a fixed calibration file with varying test density settings for the security feature is printing using various print processes (both digital and traditional offset), such that an example of a printed document 11 illustrates the print result of an electronic calibration file using an offset web press with a specified workflow A, where 115 represents the optimal setting to be assigned to the novel resilient void pantograph security feature. In this example, the optimal setting 115 represent an electronic density of value X % such that when X % is put through the entire print process specific to workflow A, the resilient void pantograph security feature of value X % in its electronic file format would produce the optimal effectiveness results at its final printed document format. In second example, printed document 12 illustrates the printed results of an electronic calibration file using an offset sheet-fed press with another specified workflow B, where 116 represents the optimal setting to be assigned to the novel resilient void pantograph security feature. In this example, the optimal setting 116 represent and electronic density of value X %+Y % such that when X % 30 Y % is put through the entire print process specific to workflow B, the resilient void pantograph security feature of value X %+Y % in its electronic file format would produce the optimal effectiveness results at its final printed document format. This shows that the optimal density for workflow B increased by an increment of Y % when compared to workflow A which is a reflection that the dot gain curve is greater in workflow A when compared to workflow B, such that the printed value of X % in workflow A is equal to the printed value of X %+Y % in workflow B. A third example of printed document 14 illustrates an example of the printed results of an electronic calibration file using OCE 5000 digital inkjet press with yet another specified workflow C, where 118 represents the optimal setting to be assigned to the novel resilient void pantograph security feature. In this example, the optimal setting 118 represent and electronic density of value X %+2Y % such that when X %+2Y % is put through the entire print process specific to workflow C, the resilient void pantograph security feature of value X %+2Y %, in its electronic file format would produce the optimal effectiveness results at its final printed document format. This shows that the optimal density for workflow C increased by an increment of 2Y % when compared to workflow A and increased by an increment of 1Y % when compared to workflow B. The last example of printed document 13 illustrates an example of the printed results of an electronic calibration file using Samsung digital desktop color printer with yet another specified workflow D, where 117 represents the optimal setting to be assigned to the novel resilient void pantograph security feature. In this example, the optimal setting 117 represent and electronic density of value X %+3Y % such that when X %+3Y % is put through the entire print process specific to workflow D, the resilient void pantograph security feature of value X %+3Y %, in its electronic file format would produce the optimal effectiveness results at its final printed document format. This shows that the optimal density for workflow D increased by an increment of 3Y % when compared to workflow A and increased by an increment of 2Y % when compared to workflow B and increased by an increment of 1Y % when compare to workflow C. The values, presses and printers sited in these examples are representation of possible values, equipment and final outcomes and are meant to demonstrate the effect of the dot gain curve when the fixed calibration file is put through various print processes and workflow. Although the electronic optimal setting of the resilient void pantograph feature differs for each print processes, the final printed document format would be similar, where, the combined void pantograph screen with the faux watermark have been optimized to work effectively on the photocopiers even if the final printed document was printed on a lower resolution output device when compare to the scan and output resolution of the copier.

Additional object of the present invention is the utilization of the calibrated resilient void pantograph security feature in its electronic file format can conveniently be issued on-demand onto plain paper along with the variable text and or information of the document in one pass, using any digital output device driven by an executable software, print driver and/or printer firmware application. In some examples, the calibrated resilient void pantograph security feature in its electronic file format may be formed using native processes and functions provided in conventional software programs, including but not limited to Quark Express®, Adobe In-Design®, Adobe PageMaker®, Adobe Illustrator®, Corel Draw™, Microsoft Office Publisher®, Microsoft Office®, Sun Open Office™, Corel WordPerfect™, Adobe Acrobat® and combination thereof. Furthermore, the calibrated resilient void pantograph security feature in its electronic file format may be set to the same resolution (i.e., 100% of the resolution of the corresponding output device) or fractions of the output resolution of the output device. It may also be appreciated that the calibrated resilient void pantograph security feature in its electronic file format may be saved in a variety of formats, including but not limited to BMP, RLE, GIF, EPS, JPEG, PCT, PNG, TIFF, EMF, WMF, RAW and combinations thereof, or may reside in a client/server based printer driver as well as in the firm ware of digital output equipment.

It may further be appreciated that the calibrated resilient void pantograph security feature in its electronic file format may be selected on-demand for output with or without other document content. In addition, it may be appreciated that this source file may be provided in a single bit file format or a multi-bit gray scale or color image file.

A library of RVP and Recall on Demand

Figure 12:
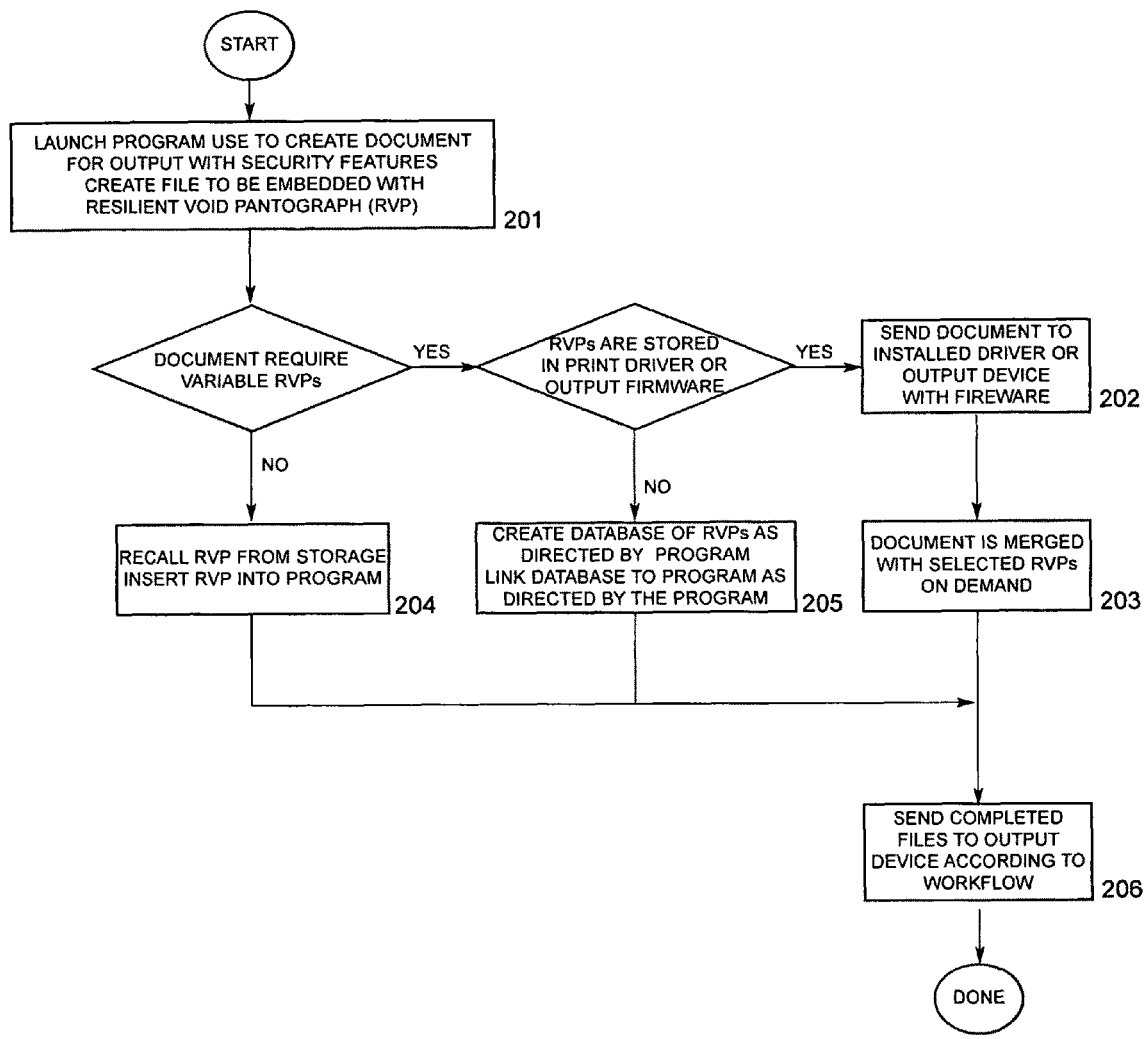
FIG. 12 shows an example of a process of providing a combined calibrated resilient void pantograph electronic security graphic file onto other documents to form an anti-copy document.

In FIG. 12 the process may begin with launching an executable program to be use to layout and output the document which require the incorporation of the calibrated resilient void pantograph security feature 201, wherein based on the print protocol of the workflow. If such calibrated resilient void pantograph security features in its electronic format are stored within a print driver application or the firmware of the output device, the document would be sent directly to the print driver or the output device with firmware 202 directly, the document is then automatically merged with the selected calibrated resilient void pantograph security feature on-demand 203, the merged file is sent through the output device 206 where the final product is a secured printed document with a calibrated resilient void pantograph security feature. This would be applicable for variable calibrated resilient void pantograph security features variable with each output. Prior to the merging process 203, a data base of variable calibrated resilient void pantograph security features would be set up and link to the document 205, after the linking process is completed, the files are sent the output device 206.

Alternately, if the of the calibrated resilient void pantograph security features are stored elsewhere such as a client computer unit or server network, the process may begin with launching an executable program to be use to layout and output the document which require the incorporation of the calibrated resilient void pantograph security feature 201, the user would recall the calibrated resilient void pantograph security feature an insert it into the document 204, the file is than sent through the output device 206 where the final product is a output contain a calibrated resilient void pantograph security feature. It may be appreciated that the above steps may occur in a number of orders and may not be limited to the order presented above.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed is:

1. A method to produce an anti-copy document comprising: a) running a calibration for a void pantograph and a faux watermark; b) creating a Resilient Void Pantograph including said void pantograph and said faux watermark and c) producing said Resilient Void Pantograph by printing said void pantograph security feature with said faux watermark onto the same side of a document, wherein said document is authenticable with the unaided eye by verifying the presence or absence of the void pantograph and faux watermark on the document, where (i) the presence of the expected reactions of a void pantograph such that the presence of the hidden warning phrase is visible coupled with the presence of the faux watermark on the document equates to a COPY of the anti-copy document, (ii) the absence of the expected reactions of a void pantograph such that the hidden warning phrase is not visible coupled with the absence of the faux watermark equates to a COPY of the anti-copy document, (iii) the presence of the expected reactions of a void pantograph such that the presence of the hidden warning phrase is visible coupled with the absence of the faux watermark on the document equates to a COPY of the anti-copy document, or (iv) the absence of the expected reactions of a void pantograph such that the absence of the hidden warning phrase is not visible coupled with the presence of faux watermark equates to a ORIGINAL of the anti-copy document.

2. The method of claim 1 wherein the resilient void pantograph is calibrated specifically for each print process either the traditional print processes and/or printing on digital output devices.

3. The method of claim 1 wherein the resilient void pantograph is a converted electronic digital file in a format suited for use as a stand-alone graphic image or incorporated into other programs ready for output onto the output device.

4. The method of claim 3 wherein said converted resilient void pantograph electronic digital file resides in a client/server based printer driver or firmware of digital output equipment.

5. An authenticable anti-copy document by the unaided eye comprising: a calibrated Resilient Void Pantograph including a void pantograph security feature and a faux watermark printed on the same side of the document; wherein the authenticity of said document is determined by verifying the presence or absence of the void pantograph and faux watermark on the document, where (i) the presence of the expected reactions of a void pantograph such that the presence of the hidden warning phrase is visible coupled with the presence of the faux watermark on the document equates to a COPY of the anti-copy document, (ii) the absence of the expected reactions of a void pantograph such that the hidden warning phrase is not visible coupled with the absence of the faux watermark equates to a COPY of the anti-copy document, (iii) the presence of the expected reactions of a void pantograph such that the presence of the hidden warning phrase is visible coupled with the absence of the faux watermark on the document equates to a COPY of the anti-copy document, or (iv) the absence of the expected reactions of a void pantograph such that the absence of the hidden warning phrase is not visible coupled with the presence of faux watermark equates to a ORIGINAL of the anti-copy document.

* * * * *